United States Patent
Oda (10) Patent No.: US 7,391,455 B2
(45) Date of Patent: Jun. 24, 2008

(54) SOLID-STATE IMAGING APPARATUS FOR CONTROLLING A SWEEP TRANSFER PERIOD IN DEPENDENCE UPON THE AMOUNT OF UNNECESSARY CHARGES TO BE SWEPT OUT

(75) Inventor: Kazuya Oda, Asaka (JP)

(73) Assignee: Fujifilm Corporation, Tokyo (JP)

( * ) Notice: Subject to any disclaimer, the term of this patent is extended or adjusted under 35 U.S.C. 154(b) by 757 days.

(21) Appl. No.: 10/225,123

(22) Filed: Aug. 22, 2002

(65) Prior Publication Data

US 2003/0048371 A1 Mar. 13, 2003

(30) Foreign Application Priority Data

Sep. 7, 2001 (JP) ............................. 2001-271774

(51) Int. Cl.
*H04N 5/335* (2006.01)
*H04N 5/217* (2006.01)
*H04N 9/64* (2006.01)
*H01L 31/062* (2006.01)

(52) U.S. Cl. ..................... 348/314; 348/241; 348/248; 348/299; 257/291

(58) Field of Classification Search ................. 348/314, 348/299, 243, 248
See application file for complete search history.

(56) References Cited

U.S. PATENT DOCUMENTS 4,233,632 A * 11/1980 Akiyama ................... 348/308
4,462,047 A * 7/1984 Fujimoto et al. ............ 348/297
4,556,911 A * 12/1985 Imaide et al. ............... 348/297
4,875,101 A * 10/1989 Endo et al. .................. 348/314
5,113,245 A * 5/1992 Oda ........................... 348/249
5,122,850 A * 6/1992 Burkey ....................... 348/314
5,282,041 A * 1/1994 Tani et al. ................... 348/299
5,339,162 A * 8/1994 Tani ........................... 348/298
5,523,786 A * 6/1996 Parulski ...................... 348/364
6,778,215 B1 * 8/2004 Nakashima et al. ......... 348/312
2001/0028401 A1 * 10/2001 Miyashita et al. ........... 348/311

FOREIGN PATENT DOCUMENTS

JP 59-044179 * 3/1984

* cited by examiner

*Primary Examiner*—Nhan T. Tran
(74) *Attorney, Agent, or Firm*—McGinn IP Law Group PLLC (57) ABSTRACT

A solid-state image pickup apparatus includes a solid-state image sensor having photosensitive cells and vertical transfer paths. The cells are bidimensionally arranged for converting light incident from a subject via optics to electric charges corresponding to the light to store signal charges. The vertical transfer paths each adjoins the photosensitive cells arranged on a particular column for vertically transferring the signal charges. Before the signal charges are transferred from the cells to the vertical transfer paths, a sweep controller causes unnecessary charges on the vertical transfer paths to be swept out. The sweep controller controls a sweep transfer period necessary for the sweep transfer in dependence upon the amount of the unnecessary charges.

2 Claims, 6 Drawing Sheets

SOLID-STATE IMAGING APPARATUS FOR CONTROLLING A SWEEP TRANSFER PERIOD IN DEPENDENCE UPON THE AMOUNT OF UNNECESSARY CHARGES TO BE SWEPT OUT

BACKGROUND OF THE INVENTION

1. Field of the Invention

The present invention relates to a solid-state image pickup apparatus and a method of driving the same. More particularly, the present invention relates to a solid-state image pickup apparatus of the type sweeping out unnecessary charges existing on the vertical transfer paths before reading out signal charges from photosensitive cells and transferring them to vertical transfer paths.

2. Description of the Background Art

A digital still camera and a video camera belong to a family of image pickup systems using solid-state image sensing devices. Today, in the imaging art, the charge transfer type of solid-state image sensing devices typified by a CCD (Charge Coupled Device) image sensor are predominant over the other types of image sensing devices. Smear and blooming are undesirable phenomena particular to a charge transfer type of solid-state image sensing device. Smear refers to whitish stripe-like noise appearing in a reproduced picture over the entire field in the vertical direction when the luminance of part of a subject picked up is predominantly higher. Blooming refers to an occurrence that when the quantity of light incident to a photosensitive cell or pixel is excessively greater, that cell generates an excessive signal charge which in turn leaks into surrounding photosensitive cells, rendering portions around the cell white.

Other noise components particular to semiconductor devices associated with imaging include dark signal or dark current components, i.e., charges stored little by little with the elapse of time even when light is intercepted, e.g., when the shutter of a camera is closed. The smear components, blooming components and dark signals appear in a picture as fixed pattern noise, and are factors which will degrade image quality.

In light of the above, it is a common practice with a digital still camera of the type controlling an exposure time with a mechanical shutter to execute the following procedure in order to sweep up dark signal components generated on vertical transfer paths and smear and blooming components leaking from photosensitive cells. After the mechanical shutter has been closed, the vertical transfer paths and a horizontal transfer path connected thereto are driven at a rate higher than a usual transfer rate for thereby sweeping up charges from the vertical transfer paths. This processing will be referred to as sweep transfer hereinafter. Subsequently, signal charges are read out from the cells.

To give priority to resolution in a still picture mode to other features, a digital still camera uses either one of a solid-state image sensing device performing progressive scanning and a solid-state image sensing device performing frame scanning. The progressive scanning refers to a procedure that reads out signal charges from the whole pixels in a picture at the same time and transfers them pixel by pixel. The frame scanning refers to a procedure that reads out signal charges alternately field by field from odd-numbered lines and even-numbered lines.

When use is made of the image sensing device performing the frame scanning, two fields of signals are necessary for producing a single picture, i.e., a single frame. Therefore, when a digital still camera produces a single picture by a single exposure, its mechanical shutter must be closed after exposure in order to intercept light for thereby preventing the first and second fields from being varied. In this case, unnecessary charges are swept out after the mechanical shutter has been closed.

The image sensing device performing the progressive scanning allows a single picture to be produced by a single exposure without resorting to a mechanical shutter. However, sweep transfer is essential even with this type of image sensing device because dark signal components are generated in the vertical transfer paths and because smear components and blooming components leak from the photosensitive cells.

It has been customary to assign a preselected transfer frequency and a preselected number of transfer stages to sweep transfer, and therefore to fix a sweep transfer period necessary for dissipating unnecessary charges. The transfer frequency and the number of transfer stages, i.e., the sweep transfer period has heretofore been determined such that sweeping is repeated, e.g., three consecutive times for sweeping out the expected maximum amount of unnecessary charges. Why sweeping is repeated a plurality of times will be described hereinafter.

Assume that an excessive quantity of light is incident to the image sensing device, causing the smear components and blooming components to increase. Then, such an amount of unnecessary charges to be swept out exceeds the transfer capacity of the vertical transfer paths and cannot be swept out by a single sweeping step. As a result, part of the unnecessary charges is left on the vertical transfer paths after the sweeping step.

More specifically, the operator of a digital still camera may shoot a desired scene while watching a picture displayed on an LCD (Liquid Crystal Device) monitor screen, i.e., without viewing the scene through an optical finder. An excessive quantity of light may be incident to the image sensing device when the operator shoots a scene including, e.g., the sun in the daytime while viewing the LCD monitor screen. Consequently, vertical stripes ascribable to the defective sweeping appear in the resulting picture on the monitor screen because the amount of unnecessary charges to be swept out exceeds the transfer capacity of the vertical transfer paths.

The three times of sweeping, for example, have customarily been effected in consideration of the defective sweeping stated above. This, however, sometimes makes the sweep transfer time excessively long in comparison to the amount of unnecessary charges actually stored on the vertical transfer paths, thereby extending the overall image-pickup time for a single picture. Furthermore, the sweep transfer is effected at a high speed and therefore consumes substantial power per unit period of time. In this sense, too, the excessively long sweep transfer period is not desirable.

SUMMARY OF THE INVENTION

It is an object of the present invention to provide a solid-state image pickup apparatus capable of sweeping out unnecessary charges in an optimal period for sweep transfer, and a method of driving the same.

A solid-state image pickup apparatus of the present invention includes a solid-state image sensor having photosensitive cells and vertical transfer paths. The cells are bidimensionally arranged for converting light incident from a subject via optics to electric charges corresponding to the light to store signal charges. The vertical transfer paths each adjoins the photosensitive cells arranged on a particular column for vertically transferring the signal charges. Before the signal charges are transferred from the cells to the vertical transfer paths, a sweep controller causes unnecessary charges on the vertical transfer paths to be swept out. The sweep controller controls a sweep transfer period necessary for the sweep transfer in dependence upon the amount of unnecessary charges.

Also, in accordance with the present invention, a method of driving a solid-state image pickup apparatus begins with the step of preparing a solid-state image pickup apparatus including a solid-state image sensor having photosensitive cells and vertical transfer paths. The cells are bidimensionally arranged for converting light incident from a subject via optics to electric charges corresponding to the light to store signal charges. The vertical transfer paths each adjoins the photosensitive cells arranged on a particular column for vertically transferring the signal charges. Sweep transfer is effected for transferring and sweeping out unnecessary charges from the vertical transfer paths. A sweep transfer period necessary for the sweep transfer is varied in dependence upon the amount of the unnecessary charges. Subsequently, signal charges stored in the photosensitive cells are transferred to the vertical transfer paths.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
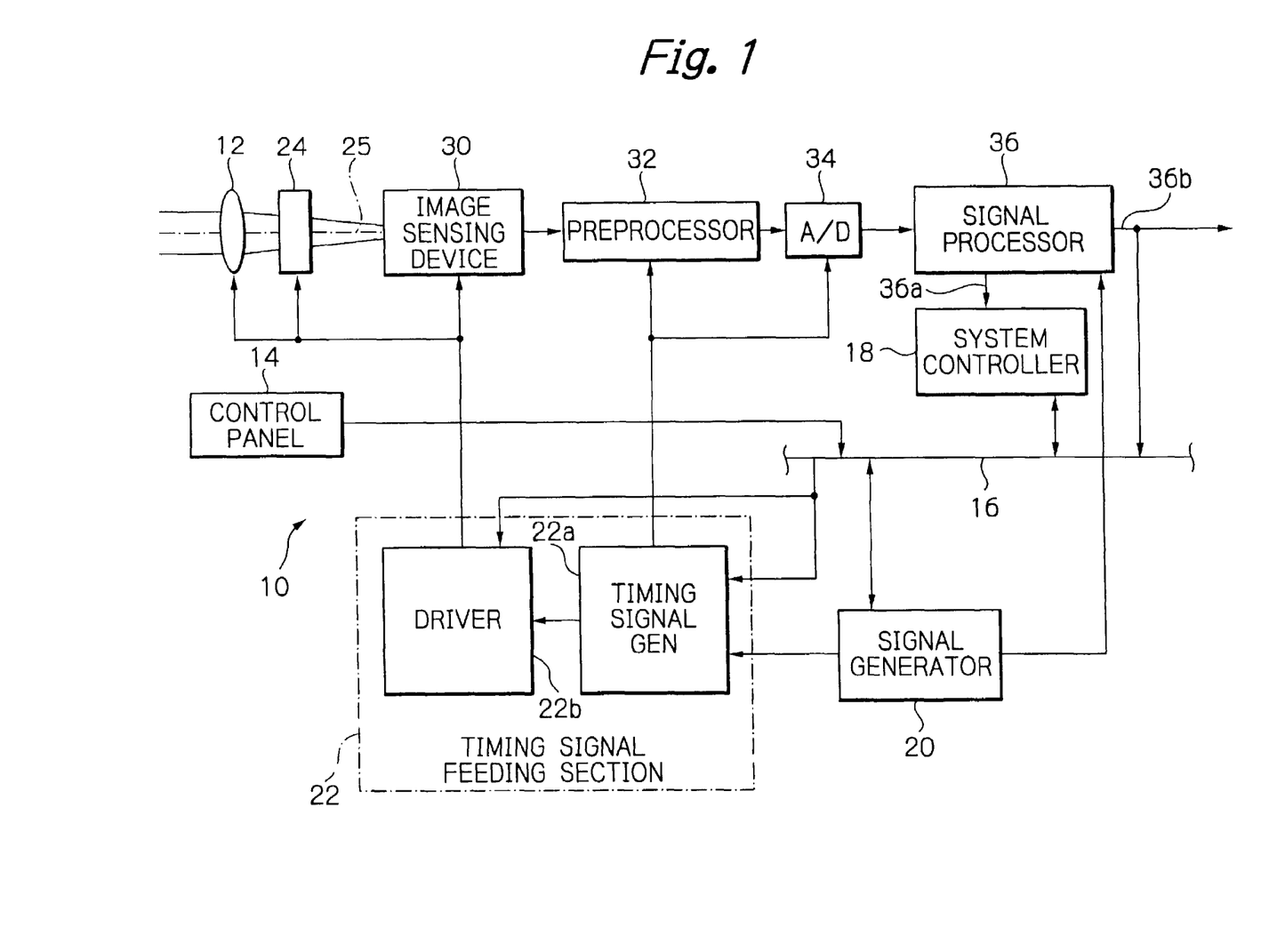
FIG. 1 is a schematic block diagram showing a solid-state image pickup apparatus embodying the present invention.

Referring to FIG. 1 of the drawings, a solid-state image pickup apparatus including a solid-state image sensing device embodying the present invention is implemented as a digital still camera by way of example. Briefly, the digital still camera, generally 10, continuously monitors the quantity of unnecessary charges being swept out from the solid-state image sensing device over a sweep transfer period and ends sweeping when the quantity of unnecessary charges decreases below a preselected value or threshold. While the following description will concentrate on a still picture mode available with a digital still camera, the present invention is similarly applicable to a movie mode also available with such a camera and even to a video camera.

As shown in FIG. 1, the digital still camera 10 generally includes an optical lens system 12, a control panel 14, a system controller 18, a signal generator 20, a timing signal feeding section 22, an iris control mechanism 24, an image sensing device 30, a preprocessor 32, an AD (Analog-to-Digital) converter 34, and a signal processor 36 as interconnected as shown. It is to be noted that part of the digital still camera 10 not directly relevant to the understanding of the present invention is not shown nor will be described specifically.

The lens system 12 includes, e.g., a plurality of optical lenses assembled together, a zoom mechanism, and an AF (Automatic Focusing) mechanism although not specifically shown. The zoom mechanism controls the positions of the lenses on the optical axis 25, FIG. 1, thereof, and therefore the angle viewing the field in response to an operational signal output from the control panel 14. The AF mechanism controls the focus of the lens system 12 in accordance with the distance from the camera 10 to a subject to be picked up. The zoom mechanism and AF mechanism perform such control on the basis of the luminance of a subject, a shutter speed, an F value or lens opening and other information produced by preliminary pickup operation. The preliminary pickup operation is effected when the operator of the camera 10 pushes a shutter release button, not shown, included in the control panel 14 to, e.g., its half-stroke position.

The signal output from the control panel 14 is delivered to the system controller 18 over a system bus 16. The timing signal feeding section 22 is made up of a timing signal generator 22a and a driver 22b as interconnected as shown. To the optical lens system 12, a drive signal is fed via the signal generator 20, timing signal generator 22a, and driver 22b. When the operator pushes the shutter release button to its full-stroke position for actually picking up a desired subject, a pickup timing signal is delivered to the various sections of the camera 10.

The control panel 14, which includes the shutter release button, is configured to allow the operator to, e.g., choose desired items appearing on its monitor screen, not shown. Particularly, the shutter release button is adapted to send out a particular operation signal to the system controller 18 over the system bus 16 at each of the half- and full-stroke positions thereof.

The system controller 18 includes, e.g., a CPU (Central Processing Unit) and a ROM (Read Only Memory) storing operation procedures for working the camera 10, although not shown specifically. The system controller 18 generates control signals in accordance with information received from the control panel 14 and information stored in the ROM. The control signals are delivered to the signal generator 20, timing signal feeding section 22, preprocessor 32, AD converter 34, signal processor 36 and so forth on the system bus 16 although signal lines are not shown specifically in FIG. 1.

The system controller 18 plays the role of a sweep controller at the same time. The sweep controller transfers and thereby sweeps up unnecessary charges from vertical transfer paths arranged in the image sensing device 30 before the transfer of signal charges from photosensitive cells also arranged in the image sensing device 30 to the vertical transfer paths. Further, the system controller 18 plays the role of monitoring means for monitoring the output 36a of the signal processor 36 to determine the amount of unnecessary charges. As soon as the amount of unnecessary charges decreases below a preselected value or threshold, the system controller 18 commands, via the bus 16, the timing signal feeding section 22 to stop feeding transfer clocks to the image sensing device 30, thereby ending the sweep transfer. The preselected value mentioned above is stored in the ROM of the system controller 18 at the time of manufacturing the camera 10. Alternatively, the camera 10 may be designed, if desired, such that the preselected value may be input on the control panel 14 after the camera 10 has been manufactured.

The signal generator 20 includes an oscillator, not shown, for generating a system clock under the control of the system controller 18. The system clock is delivered to the timing signal feeding section 22 and signal processor 36. Further, the system clock is fed to the system controller 18 on, e.g., the system bus 16 for defining a reference operation timing.

In the timing signal feeding section 22, the timing signal generator 22a is commanded by the system controller 18 to end the previously mentioned sweep transfer period. The timing signal feeding section 22 generates particular timing signals, including vertical and horizontal transfer clocks, for each of the sweep transfer and the actual read transfer different from and following the former. The timing signals assigned to sweep transfer are higher in rate than the timing signals assigned to read transfer.

More specifically, the timing signal generator 22a generates, in response to the system clock and control signal, timing signals for causing the image sensing device 30 and other sections of the camera 10 to operate. Basically, the timing signal generator 22a generates the timing signals under the control of the system controller 18 and feeds them to the driver 22b as well as the other sections, as shown in FIG. 1. The driver 22b delivers drive signals to the zoom control mechanism and AF mechanism of the optical lens system 12, iris control mechanism 24 and image sensing device 30 in response to the timing signals. The driver 22b may also be adapted to be directly controlled by the system controller 18, if desired.

The iris control mechanism 24 controls the cross-sectional area of an incident light beam, i.e., an aperture area such that an optimal light beam is incident to the image sensing device 30 at the time of picking up a scene. The iris control mechanism 24 also operates in response to the drive signal output from the driver 22b under the control of the system controller 18. More specifically, the system controller 18 calculates an F value or lens opening and an exposure time or shutter speed on the basis of the signal charges output from the image sensing device 30, as referred to as AE (Automatic Exposure) processing. The system controller 18 then feeds the timing signal generator 22a with control signals representative of the AE values, so that the timing signal generator 22a delivers a drive signal based on the control signals to the iris control mechanism 24 via the driver 22b.

Figure 2:
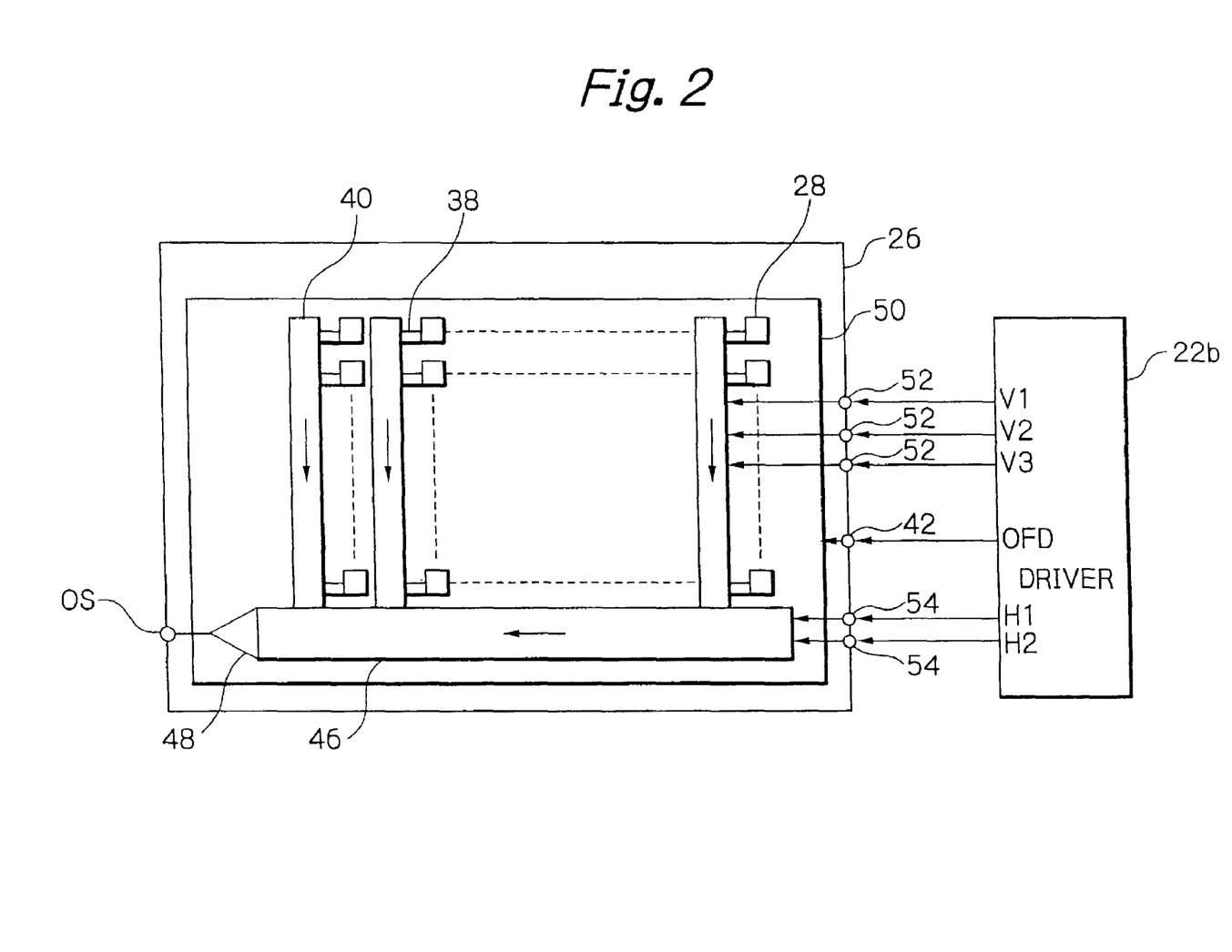
FIG. 2 shows in a schematic block diagram a specific configuration of an image sensing device included in the image sensor included in the image sensing device together with the driver in the embodiment shown in FIG. 1.

FIG. 2 shows a specific configuration of a CCD (Charge coupled Device) image sensor 26 included in the image sensing device 30 together with the driver 22b. As shown, the CCD image sensor 26 in which a array of photosensitive cells or pixels 28 for photoelectric transduction are arranged in rows and columns in a plane perpendicular to the optical axis 25, FIG. 1, of the optical lens system 12. Color filter segments, not shown, for color separation are arranged on the incidence side of the image sensing device 26 in one-to-one correspondence to the photosensitive cells. In the illustrative embodiment, the color filter segments may be either one of primary color filter segments or complementary color filter segments. The image sensing device 30 outputs signal charges generated by photoelectric transduction in the form of electric image signals in response to the drive signals or transfer clocks. Although the illustrative embodiment is adapted to effect the progressive scanning for reading the whole pixels, the progressive scanning may be replaced with the frame scanning, if desired.

In the CCD image sensor 26, the photosensitive cells 28 are implemented as, e.g., the PN-junction type of photodiodes, and each converts light incident thereto to a signal charge corresponding to the amount of light and stores the signal charge. One vertical transfer path, i.e., one column of vertical transfer CCDs 40 is assigned to each column of cells 28. In this configuration, the signal charges read out from the cells 28 via associated read gates 38 are vertically transferred along the vertical transfer paths 40.

More specifically, a read pulse FS (see FIG. 3) is applied to the gate electrode of each read gate 38 with the result that a potential beneath the gate electrode becomes deeper. Consequently, the signal charge stored in the cell 28 connected to the gate 38 is read out and transferred to the adjoining vertical path 40. To implement the progressive scanning, three transfer electrodes, for example, are assigned to each of the pixels on the vertical transfer path 40, although not shown specifically. The driver 22b feeds three-phase vertical transfer clocks V1, V2 and V3 to the three transfer electrodes, respectively. The signal charges read out from the cells or photodiodes 28, which constitute one line (horizontal scanning line), are vertically transferred together in response to the vertical transfer clocks V1, V2 and V3. Such transfer is repeated line by line.

On the vertical transfer paths 40, the transfer electrodes to which the vertical transfer clock V1 of a first phase are applied serve as the gate electrodes of the read gates 38 at the same time. More specifically, in the illustrative embodiment, the vertical transfer clock Vi is selectively controlled to a low level, a medium level or a high level thereof. Pulses with the high level, or the third level, are applied to the gate electrodes of the read gates 38 as read pulses FS.

The vertical transfer paths 40 are connected to a horizontal transfer path or horizontal transfer CCD 46, so that one line of signal charges are handed over from the vertical transfer paths 40 to the horizontal transfer path 46 at a time. The driver 22b feeds the horizontal transfer path 46 with, e.g., two-phase horizontal transfer clocks H1 and H2. The horizontal transfer clocks H1 and H2 cause the horizontal transfer path 46 to transfer each line of signal charges in the horizontal direction. In the vicinity of the horizontal transfer path 46, an overflow drain, not shown, extends horizontally, so that signal charges overflowing from the horizontal transfer path 46 are swept out via the overflow drain.

To the end of the horizontal transfer path 46 in the direction of charge transfer, a charge-to-voltage converter 48 is connected which is implemented as, e.g., a floating diffusion amplifier. The charge-to-voltage converter 48 converts the signal charges transferred along the horizontal transfer path 46 to associated signal voltages one by one. The signal voltages are output from the charge-to-voltage converter 48 via an output circuit, not shown, as the output OS of the CCD image sensor 26. Each signal voltage is therefore representative of the quantity of light incident to a particular cell 28.

Figure 3:
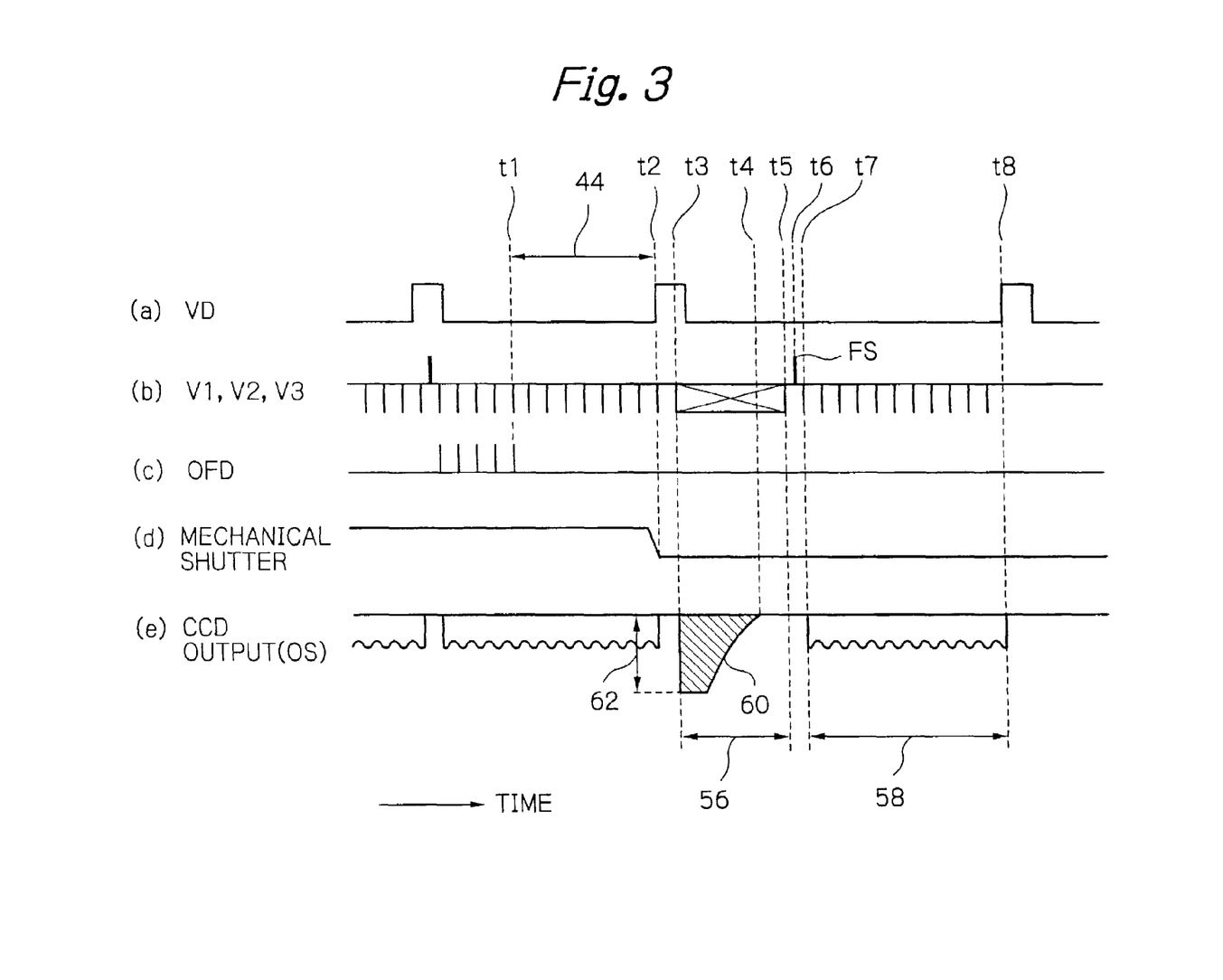
FIG. 3 is a timing chart useful for understanding a specific operation of the image sensing device shown in FIG. 2.

The CCD image sensor 26 additionally includes a semiconductor substrate 50. To the substrate 50, shutter pulses OFD, FIG. 3(c), for electronic shutter releasing are also applied from the driver 22b. Before the start of actual exposure for a shot, the shutter pulses OFD cause the signal charges stored in the cells 28 to be discharged to the substrate 50, thereby preparing the CCD image sensor 26 for the actual exposure. The shutter pulses OFD are fed to the CCD image sensor 26 via a contact pad 42 during horizontal blanking periods.

The cells 28, read gates 38, vertical transfer CCDs 40, horizontal transfer CCD 46 and charge-to-voltage converter 48 are arranged on the semiconductor substrate 50, constituting the progressive scanning type of CCD image sensor 26.

The three-phased vertical transfer clocks V1, V2 and V3 each are fed from the driver 22b to the vertical CCDs 40 via a particular terminal 52 formed on the substrate 50. Likewise, the two-phased horizontal transfer clocks H1 and H2 each are fed from the driver 22b to the horizontal CCD 46 via a particular terminal 54 formed on the substrate 50. FIG. 3 is a timing chart showing the vertical transfer clocks V1, V2 and V3 and other signals appearing in the illustrative embodiment. As shown, the illustrative embodiment sequentially executes actual exposure 44, sweep transfer 56 and actual read transfer 58 in this order, as will be described specifically hereinafter.

The actual exposure 44 is effected in accordance with the exposure time and F value, which are determined by the system controller 18 on the basis of an image picked up by preliminary pickup preceding the actual exposure 44. The timing signal generator 22a receives information defining to the exposure time and F value and then receives an actual exposure start command from the system controller 18. The timing signal generator 22a determines an exposure start time t1 in response to the actual exposure start command. In the illustrative embodiment, an exposure end time t2 is coincident with the beginning of a vertical blanking period during which a vertical synchronizing signal VD shown in FIG. 3, line (a), remains in its high level. The mechanical shutter is caused to open at the beginning of preliminary pickup.

The timing signal generator 22a repeatedly outputs the shutter pulses OFD up to the actual exposure start time t1, causing signal charges stored in the cells 28 to be discharged via the substrate 50. The timing signal generator 22a commands the driver 22b to close the mechanical shutter at the actual exposure end time t2. Subsequently, the sweep transfer 56 starts at a time t3. The vertical transfer clocks V1, V2 and V3 have higher frequency during sweep transfer 56 than during actual read transfer 58. As a result, before signal charges are actually read out, signal charges stored in the vertical transfer paths are swept out at a higher rate than during actual read transfer.

Before signal charges are read out from the cells 28 in synchronism with the read pulses FS, the sweep transfer 56 is executed to sweep out the dark signal components (in the form of current) generated in the vertical CCDs 40 and the smear and blooming components (in the form of charges) leaking from the cells 28 into the vertical CCDs 40. More specifically, such unnecessary signal components and charges are transferred to the horizontal CCD 46 in the vertical direction. Part of the components and charges overflowing from the horizontal CCD 46 is swept out via the overflow drain while the remaining part thereof is transferred by the horizontal CCDs 46 and then swept out via the charge-to-potential converter 48.

The amount of unnecessary charges is dependent on the conditions of a subject to be picked up. In FIG. 3, line (e) a curve 60 is representative of a specific amount of unnecessary charges, and reveals that the amount of unnecessary charges appearing just after the start of the sweep transfer 56 is so great as to exceed the maximum transfer capacity, or transferability, of the CCDs, where the height 62 of the curve 60 is representative of the maximum transfer capacity. As the sweep transfer 56 proceeds, the amount of unnecessary charges begins to decrease. When the amount of unnecessary charges exceeds the maximum capacity, sweeping operation is repeated up to three times, for example, during the sweeping period of time 56.

Figure 4:
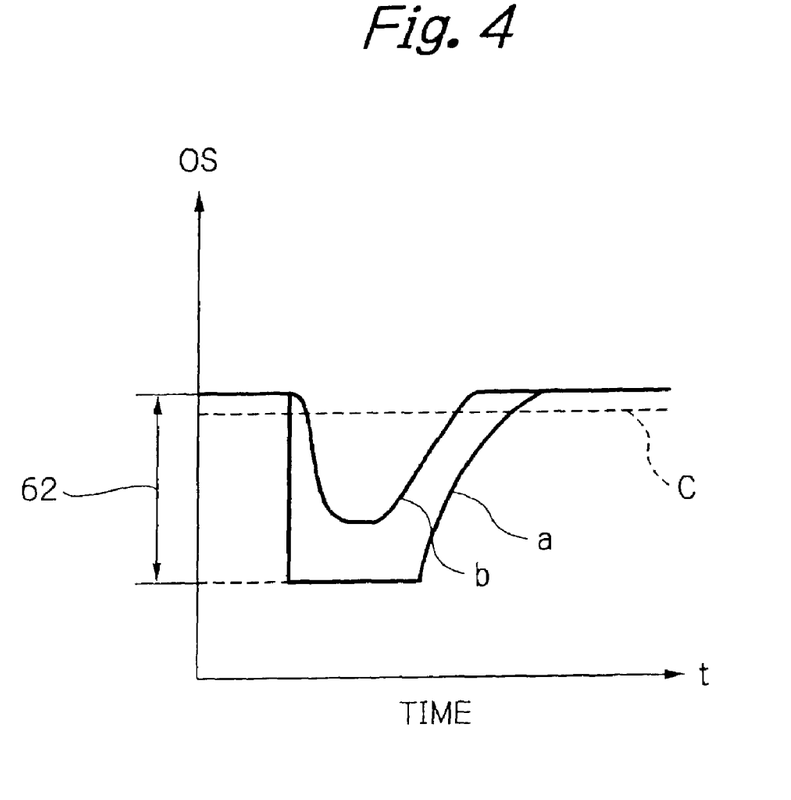
FIG. 4 plots the output from an image sensor in the illustrative embodiment useful for understanding a specific criterion for decision on a sweep transfer period.

After performing the sweep transfer at least once, the system controller 18 should preferably determine whether or not the amount of unnecessary charges has decreased below a reference value to thereby determine whether or not to end the sweep transfer. FIG. 4 plots with respect to time t a specific curve a under the condition wherein the amount of unnecessary charges is greater than a reference value c from the time just after the start of sweep transfer, and a curve b under the condition wherein the above amount is smaller than the reference amount c just after the start of sweep transfer but increases above the reference value c later. The above decision of the system controller 18 is desirable to cope with the condition represented by the curve b. Alternatively, the system controller 18 may be adapted to make such a decision by determining the luminance distribution of a subject during preliminary pickup operation and then sweeping part of the vertical transfer paths which is higher in luminance, rather than repeating the sweeping operation more than once.

Referring again to FIG. 3, the amount of unnecessary charges decreases below the reference value at a time t4. On detecting the decrease, the system controller 18 commands the timing signal generator 22a to end the sweep transfer 56. In response, at a time t5, the timing signal generator 22a stops outputting the high-speed vertical transfer clocks V1, V2 and V3. At a time t6 following thereto, the timing signal generator 22a delivers a read pulse FS together with the vertical transfer clock V1, causing the signal charges from being transferred from the cells 28 to the vertical transfer paths 40. The actual read transfer 58 starts at a time t7 and ends at a time t8. At the time t8, a vertical blanking period begins.

The preprocessor 32 connected to the image sensing device 30 shown in FIG. 1 includes a CDS (Correlated Double Sampling) circuit, not shown. The CDS circuit removes various kinds of noise ascribable to the CCD image sensor 26, FIG. 2, from the signal input from the image sensing device 30 and feeds the resulting signal to the AD converter 34. The AD converter 34 quantizes the input signal, which is an analog voltage signal, with respect to predetermined levels for thereby converting it to an associated digital signal in timed with a conversion clock or similar timing signal, which is output from the timing signal generator 22a. The digital signal is fed from the AD converter 34 to the signal processor 36.

The signal processor 36 on one hand transfers the input digital signal as a non-processed output 36a and delivers it to the system controller 18. The non-processed output 36a appears only during the sweep transfer period. On the other hand, the input digital signal is provided to a data corrector, a matrix processor and other processors included in the signal processor 36 for further enhancing the image quality. The data corrector includes a gamma correcting circuit for color correction and an AWB (Automatic White Balance) circuit for white balance adjustment. The matrix processor transforms R (red), G (green) and B (blue) color data to luminance data Y and color difference data (R-Y) and (B-Y) to be displayed as a color picture. The luminance data Y and color difference data (R-Y) and (B-Y) are delivered as an output 36b to a compander, a recorder and a monitor, although not shown specifically.

Figure 5:
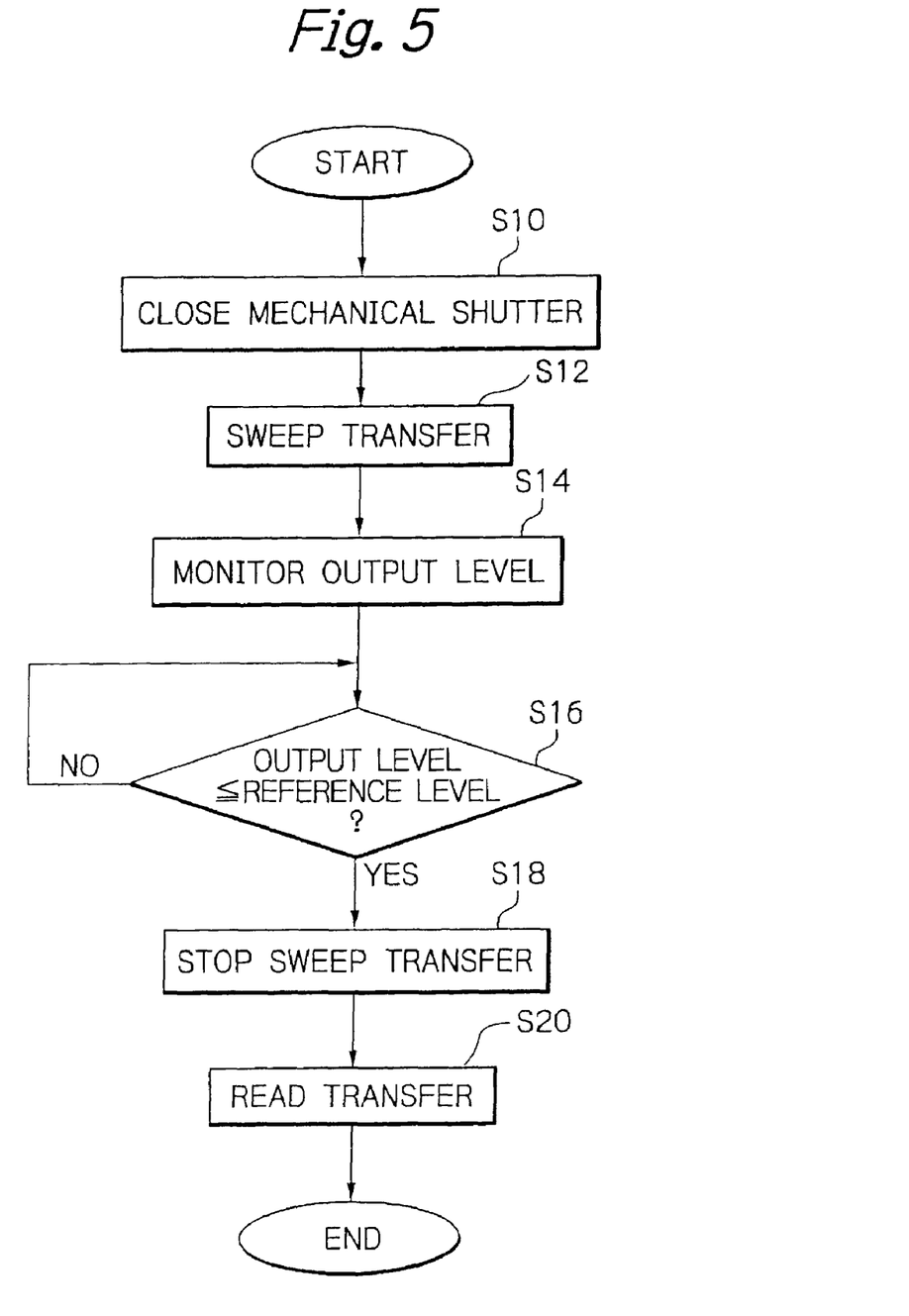
FIG. 5 is a flowchart useful for understanding a specific operation of the illustrative embodiment.

Reference will be made to FIG. 5 for describing a specific procedure to be executed by the digital still camera 10 for actual pickup following preliminary pickup. Before actual pickup, the AE and AF mechanisms are set in accordance with the various information derived from preliminary pickup. The preliminary pickup starts when the release button is depressed to, e.g., its half-stroke position while the actual pickup starts when depressed to its full-stroke position, as stated earlier.

First, the actual exposure 44 is executed in accordance with the exposure time and F value, which are determined by the system controller 18 on the basis of an image picked up during the preliminary pickup operation. The timing signal generator 22a receives the information relating to the exposure time and F value. Subsequently, when the shutter release button is depressed to its full-stroke position, the system controller 18 sends out an actual exposure start command to the timing signal generator 22a. In response, the timing signal generator 22a determines the exposure start time t1. The exposure end time t2 is coincident with the beginning of a vertical blanking period, as stated previously.

The timing signal generator 22a repeatedly outputs the shutter pulse OFD up to the actual exposure start time t1, causing signal charges stored in the cells 28 to be discharged via the substrate 50. The mechanical shutter, which forms part of the AE control mechanism, is opened from the time when the shutter release key is depressed to its half-stroke position to the time when the actual exposure 44 ends. The timing signal generator 22a feeds the driver 22b with a command for closing the mechanical shutter at the actual exposure end time t2, thereby closing the mechanical shutter (step S10).

Subsequently, the sweep transfer 56 starts at the time t3 (step S12). During sweep transfer 56, the vertical transfer clocks V1, V2 and V3 higher in frequency than during read transfer 58 are generated to effect the sweep transfer 56 at a high rate. Unnecessary charges swept out from the vertical transfer paths 40 and horizontal transfer path 46 of the image sensing device 30 are sent to the system controller 18 via the preprocessor 32, AD converter 34 and signal processor 36 as an output 36a. This allows the system controller 18 to monitor the amount of unnecessary charges, i.e., the output level (step S14). The system controller 18 determines whether or not the output level is lower than the reference level inclusive (step S16). If the answer of the step is negative (NO), then the system controller 18 repeats such a decision.

When the output level drops below the reference level at the time t4 (YES, step S16), the system controller 18 commands the timing signal generator 22a to end the sweep transfer 56 (step S18). In response, the timing signal generator 2 stops outputting the high-speed vertical transfer clocks V1, V2 and V3 at the time t5, thereby ending the sweep transfer 56. Subsequently, at the time t6, the timing signal generator 22a outputs the read pulse FS together with the vertical transfer clock Vi in order to start the transfer of signal charges from the cells 28 to the vertical transfer paths 40 (step S20). The read transfer 58 starts at the time t7 and ends at the time t8. The actual imaging has thus been finished.

In the illustrative embodiment, the transfer clocks V1, V2 and V3, and H1 and H2 are high-speed signals. Notwithstanding, the system consumes the minimum of power as a whole. This is implemented by controlling a period of time necessary for sweeping out unnecessary charges (sweep transfer 56, FIG. 3) to be minimized adaptively under the image pickup condition. Such power saving successfully increases the number of shots available with a given battery capacity for the camera.

Further, the minimum necessary duration of sweep transfer enhances the image quality of reproduced pictures. More specifically, the dark signal components increase in the cells 28 with the elapse of time even during the sweep transfer period, so that the amount of dark signal components decreases with a decrease in sweep transfer period. The improvement in image quality is more prominent with a progressing scanning system than with a frame scanning system for the following reason. Because the frame scanning system reads out the charges of a second field following the charges of a first field, the dark signal components increase during the sweep transfer period and during the read-out of the first field. In this sense, the effect of the decrease in dark signal components is not noticeable. By contrast, the progressing scanning system starts reading out data immediately after the end of the sweep transfer period, so that a decrease in sweep transfer period directly translates into a decrease in dark signal components.

Another advantage achievable with the minimum necessary sweep period is that it reduces an image pickup time for a single shot in a continuous pickup mode, thereby increasing a continuous pickup speed.

Moreover, assume that smear and blooming components increase due to intense light incident during actual exposure. Then, the illustrative embodiment, which monitors the amount of unnecessary charges being swept out, can surely sweep up the smear and blooming components together with dark signal components during the sweep transfer period. With a conventional digital still camera, the period of time for dissipating unnecessary charges available is fixed, so that unnecessary charges cannot be fully swept out when unexpected incident light is incident, e.g., when the sun is shot in the daytime. The illustrative embodiment is adapted to set a longer period of time for sweeping unnecessary charges than the conventional camera when intense light is incident, and can therefore surely sweep them out, thereby enhancing the quality of a still picture.

While the illustrative embodiment determines an optimal sweep transfer period by monitoring the quantity of unnecessary charges being swept out, it may be modified so as to estimate the quantity of unnecessary charges to determine a sweep transfer period. For example, the system controller may be adapted to determine a sweep transfer period in accordance with the conditions of a subject determined by the preliminary pickup operation. The conditions of a subject may include at least one of luminance information on a subject and the shutter speed and F value of the camera 10.

More specifically, luminance information and shutter speed are dependent on the luminance of a subject (quantity of light incident to the camera) in such a fashion that the quantity of light to be incident to the image sensing device 30 increases with an increase in the luminance of a subject field. The smear and blooming components increase with an increase in the quantity of an incident light. The smear components, in particular, increase in proportional to the intensity of an incident light. As the smear and blooming components increase, the amount of unnecessary charges on the vertical transfer paths increases, so that the sweep transfer period must be extended. This is why the system controller 18 may be configured to vary the sweep transfer period in accordance with luminance information and shutter speed.

In the alternative configuration stated above, the system controller 18 feeds the timing signal generator 22a with a sweep transfer period selected. In response, the timing signal generator 22a sends out the high-speed transfer clock to the image sensing device 30 over the sweep transfer period selected. In the configuration where the system controller 18 controls the sweep transfer period in dependence upon luminance information and shutter speed, the system controller 18 may be adapted to select a zero sweep transfer period (no sweeping) when it has determined that the luminance of a subject is low.

Another factor that may be used to determine a sweep transfer period is an F value or lens opening. This is because the quantity of incident light and the angle of light incident to the individual cell are dependent on the F value and because the amount of smear components is dependent on the quantity of the incident light and the angle of incidence, as will be described with reference to FIG. 6 hereinafter.

Figure 6:
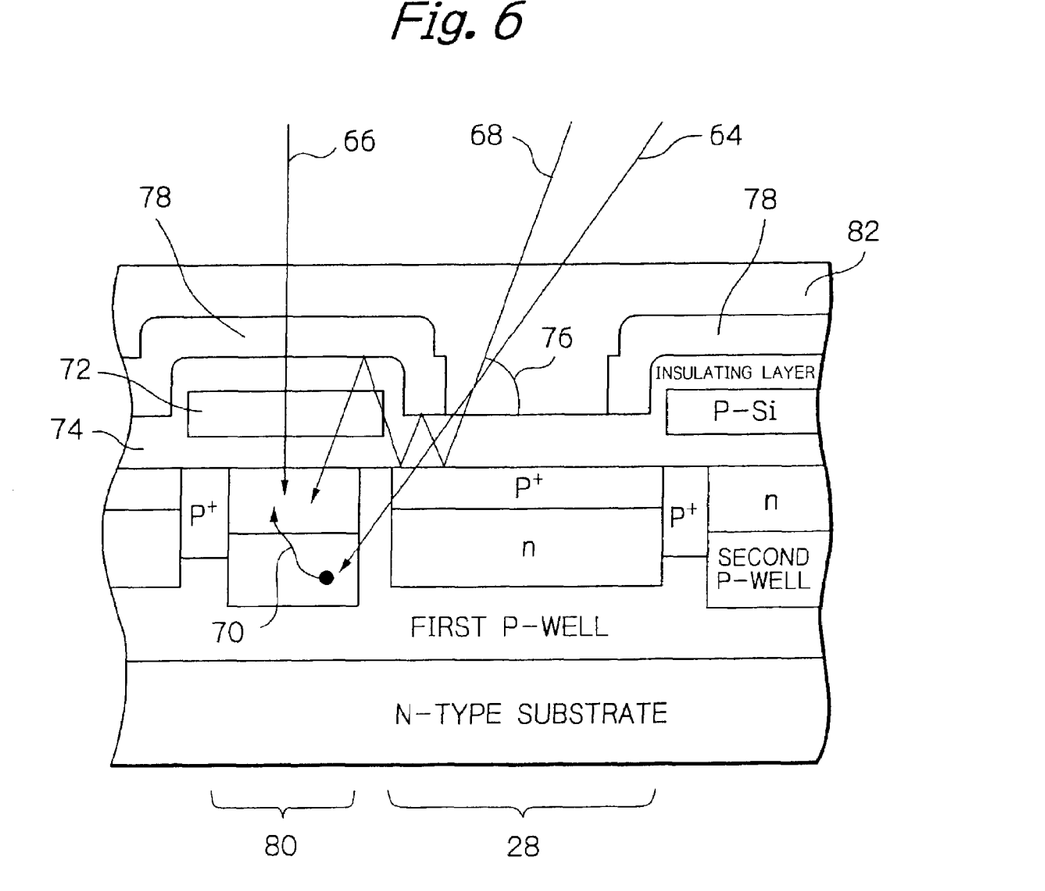
FIG. 6 is a schematic, vertical cross-sectional view of a photosensitive cell of an image sensor useful for understanding factors that bring about smear components.

FIG. 6 schematically shows how unnecessary charges are generated in the individual photosensitive cell 28 and a vertical transfer path 80 associated therewith. As shown, there are some different causes that bring about smear components. First, intense light 64 incident to the deep portion of a substrate via the cell region 28 generates a great amount of charge there. As a result, part 70 of the amount of charge diffuses into the channel of the vertical transfer path 80. Second, light 66 penetrates shielding layers 78 and a vertical transfer gate 72 to reach the vertical transfer path 80. It is to be noted that a protection layer 82 of a material transparent for light covers the entire surface of the image sensor 26. Third, light having reached the surface of the image sensor 26 is propagated through a thin layer of oxide 74 which is formed between the gate electrode 72 and the substrate and functions as a waveguide, and then enters the vertical transfer path 80.

The amount of light 68 to reach the vertical transfer path 80 increases with a decrease in the incidence angle 76 thereof. As the F value decreases, the iris opens wider, i.e., the cross-sectional area of the incident beam becomes greater. As a result, the amount of light components with small incidence angles 76 increases, causing the amount of smear components to increase. It follows that the smear components increase with a decrease in F value for a given shutter speed. The system controller 18 may therefore be configured to determine an F value by preliminary pickup operation and then determine a sweep transfer period matching with the F value. The system controller 18 feeds the timing signal generator 22a with the sweep transfer period selected. In response, the timing signal generator 22a sends out the high-speed transfer clock to the image sensing device 30 over the sweep transfer period selected.

The propagation of light is dependent on the wavelength of the light so that red light easily reaches the deeper level of the substrate. In light of this, the sweep transfer period may be adjusted in accordance with information on R, G and B components of the incident light determined at the time of preliminary pickup. More specifically, when the amount of red component is greater, the sweep transfer period should preferably be extended because the amount of smear components is presumably richer.

While the illustrative embodiment is adapted for automatically determining pickup conditions during preliminary pickup operation, it may be modified to allow the user of the camera 10 to input desired pickup conditions on the control panel 14.

The alternative configurations described above that vary the sweep transfer period in accordance with the pickup conditions achieve the same advantages as the illustrative embodiment that monitors the amount of unnecessary charges.

In summary, it will has been seen that the present invention provides a solid-state image pickup apparatus capable of sweeping out unnecessary charges in an optimal period of time and a method of driving the same.

The entire disclosure of Japanese patent application No. 2001-271774 filed on Sep. 7, 2001, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A solid-state image pickup apparatus comprising:

a solid-state image sensor comprising an array of photosensitive cells bidimensionally arranged for receiving light incident from a subject via optics and generating electric charges corresponding to the light to store signal charges, and a plurality of vertical transfer paths each adjoining part of said array of photosensitive cells which is arranged on a particular column for vertically transferring the signal charges; and a sweep controller for performing, before the signal charges are transferred from said photosensitive cells to said vertical transfer paths, sweep transfer by which unnecessary charges on said vertical transfer paths are swept out;

said sweep controller controlling a sweep transfer period necessary for the sweep transfer in dependence upon an amount of the unnecessary charges and a maximum transfer capacity, wherein said sweep controller controls the sweep transfer period necessary for the sweep transfer in accordance with a pickup condition input to said sweep controller, and wherein the pickup condition comprises luminace information on the subject, a shutter speed and an F value of said apparatus, wherein the pickup condition further comprises information on a red component of the light incident from the subject, and wherein the sweep transfer period is increased as an amount of the red component is increased.

2. A method of driving a solid-state image pickup apparatus, comprising:

preparing a solid-state image pickup apparatus comprising a solid-state image sensor including an array of photosensitive cells bidimensionally arranged for receiving light incident from a subject via optics and generating electric charges corresponding to the light to store signal charges, and a plurality of vertical transfer paths each adjoining part of the array of photosensitive cells which is arranged on a particular column for vertically transferring the signal charges;

effecting sweep transfer for transferring and sweeping out unnecessary charges present on the vertical transfer paths;

varying a sweep transfer period necessary for the sweep transfer in dependence upon an amount of the unnecessary charges and a maximum transfer capacity; and transferring signal charges stored in the photosensitive cells to the vertical transfer paths, wherein, in said varying the sweep transfer period, the sweep transfer period necessary for the sweep transfer is varied in accordance with a pickup condition, and wherein the pickup condition comprises luminace information on the subject, a shutter speed and an F value of said apparatus, wherein the pickup condition further comprises information on a red component of the light incident from the subject, and wherein the sweep transfer period is increased as an amount of the red component is increased.

* * * * *